United States Patent [19]
Linder et al.

[11] Patent Number: 6,072,142
[45] Date of Patent: *Jun. 6, 2000

[54] SWITCH ASSEMBLY FOR HIGH VOLTAGE OVERHEAD LINES

[75] Inventors: Torbjorn Linder, Saxdalen; Leif Skold, Ludvika, both of Sweden

[73] Assignee: ABB AB, Vasteras, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/101,440

[22] PCT Filed: Jan. 15, 1997

[86] PCT No.: PCT/SE97/00042

§ 371 Date: Sep. 14, 1998

§ 102(e) Date: Sep. 14, 1998

[87] PCT Pub. No.: WO97/26692

PCT Pub. Date: Jul. 24, 1997

[30] Foreign Application Priority Data

Jan. 15, 1996 [SE] Sweden .................................. 9600123

[51] Int. Cl.[7] .............................. H01H 3/00; H01H 3/24; H01H 3/32; H01H 33/34
[52] U.S. Cl. ................................. 218/154; 218/67; 218/84
[58] Field of Search ..................................... 218/7, 14, 12, 218/2, 45, 67, 78, 84–88

[56] References Cited

U.S. PATENT DOCUMENTS

| 1,959,183 | 5/1934 | Uebermuth ................................... 218/7 |
| 2,723,367 | 11/1955 | Bockman ................................... 218/84 |
| 3,089,927 | 5/1963 | Foti . |
| 4,467,157 | 8/1984 | Nicoloso et al. ..................... 200/148 F |
| 4,541,033 | 9/1985 | Saito . |
| 4,696,364 | 12/1997 | Stroud et al. ................................ 218/2 |
| 5,668,360 | 9/1997 | Perret et al. ............................. 218/143 |

FOREIGN PATENT DOCUMENTS

| A1 0265737 | 5/1988 | European Pat. Off. . |
| C 693808 | 6/1940 | Germany . |
| C 737727 | 6/1943 | Germany . |
| B 1118856 | 12/1961 | Germany . |
| A1 3214799 | 7/1983 | Germany . |
| 1202175 | 8/1970 | United Kingdom . |

*Primary Examiner*—Lincoln Donovan
*Attorney, Agent, or Firm*—Oblon, Spivak, McClelland, Maier & Neustadt, P.C.

[57] ABSTRACT

A switch assembly for high voltage overhead lines. The assembly includes circuit breakers with associated operators and circuit disconnectors with associated operators. These are supported by a stand. This switch assembly construction reduces the amount of space required by the switch gear and simplifies the erection of the switch gear. The stand has a single support base which supports all components of the switch assembly.

21 Claims, 6 Drawing Sheets

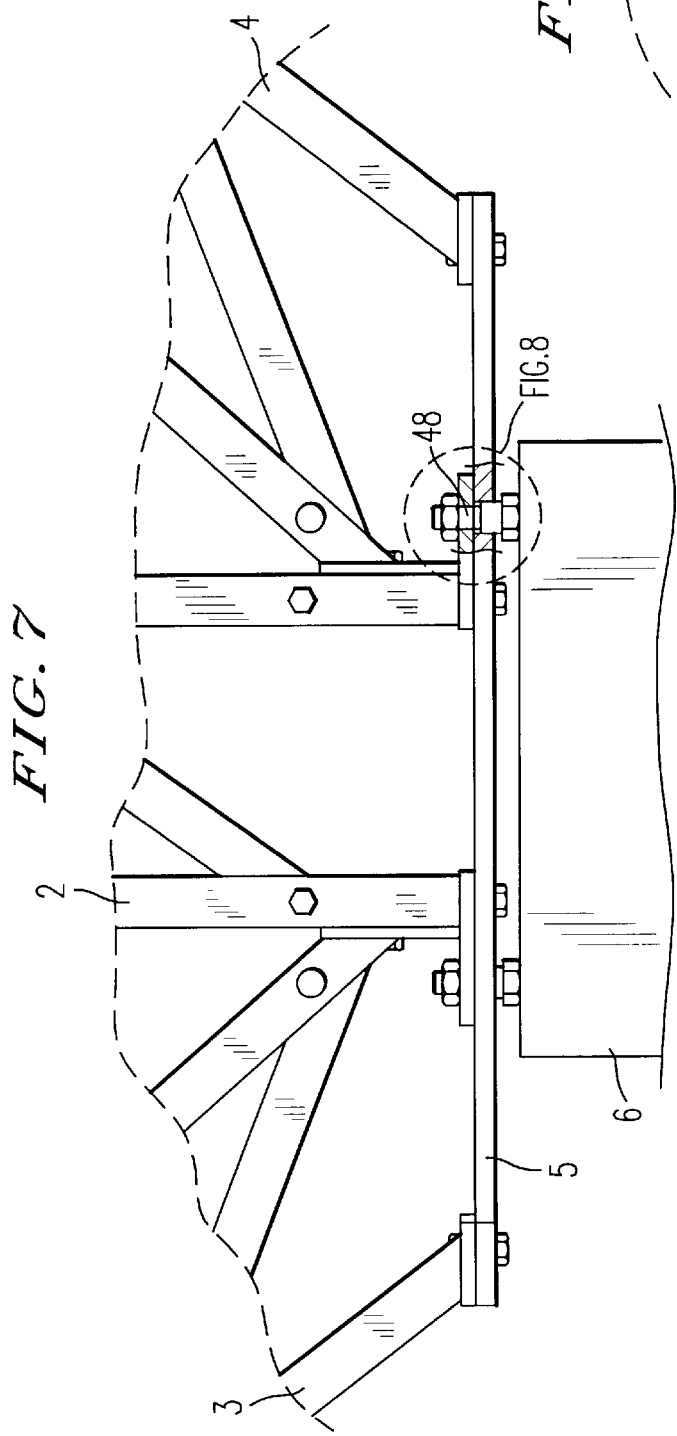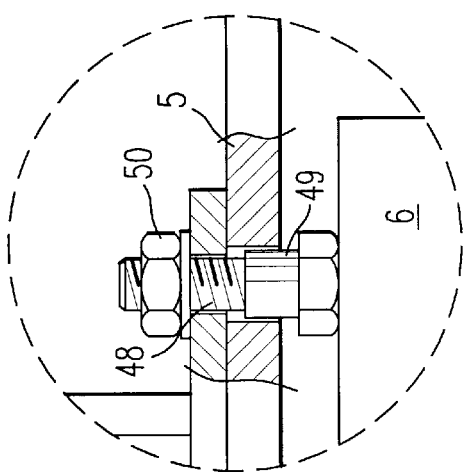

SWITCH ASSEMBLY FOR HIGH VOLTAGE OVERHEAD LINES

BACKGROUND OF THE INVENTION

1. Field of the Invention

The present invention relates to a switch assembly for high voltage overhead lines.

2. Discussion of the Background

Switch assemblies are, as a rule, constructed so that one and the same stand supports either a circuit breaker or a circuit disconnector, both of which are provided with a supporting insulator. This results generally in a simple and inexpensive stand construction with associated operating means. On the other hand, a relatively large amount of space is required when each function has its own stand, which results in a considerable total area for the switchgear as a whole. This large total ground area required by the switchgear is disadvantageous when land prices are high, when space is limited and when preparation of the ground is very demanding. The costs entailed by assembly and foundation work are also very high.

It is known from FR 2 662 568 to mount a circuit breaker and a circuit disconnector on a common frame, as illustrated in FIG. 4 of this prior publication. However, this known construction does not afford any appreciable reduction in space requirements for several reasons. For instance, the disconnectors and circuit breakers are not mounted in a manner that is beneficial in this respect. The construction also requires a stand that includes several widely spaced anchoring points. The large amount of ground space required by this stand makes it difficult to achieve a compact switchgear lay-out, particularly when wishing to maintain accessibility for service vehicles and the like between the rows of stands. Because the stand taught by this publication requires a plurality of anchorage points, it affords no appreciable reduction in foundation costs. It is also thought that correct erection of the stand would be difficult to achieve and entails costly assemblage. Corresponding constructions are also known from US-A4 541 033 and DE-C-693 808, although these constructions are also encumbered with corresponding drawbacks with regard to space requirements.

SUMMARY OF THE INVENTION

The object of the present invention is to provide a switch assembly for high voltage overhead lines that reduces the total space requirement and also brings down assembly costs, with the intention of providing switchgear that covers a smaller area and improves the total economy.

This object has been achieved in accordance with the present invention with a switch assembly of the kind defined in the preamble of claim 1 and having the characteristic features set forth in the characterizing clause of said claim.

Because both circuit breaker and circuit disconnector are mounted on one and the same stand with one single support base, the number of stands required in a single switchgear is reduced to a minimum in comparison with conventional techniques, while a switch assembly having such a stand will, in itself, be space saving and easier to erect.

According to one preferred embodiment of the invention, the stand also carries a current meter and earthing means, therewith also contributing to structural compactness.

The disconnectors are preferably mounted on and carried by the circuit breakers. This obviates the need for separate disconnector supporting insulators and disconnector stand members, therewith further contributing towards a compact switch assembly.

The disconnectors are preferably maneuvered by obliquely directed maneuvering insulators that extend from the operating end of each disconnector down to a central part of the stand.

In another preferred embodiment, the stand support base comprises a base plate that can be adjusted both vertically and angularly. This enables the switch assembly to be readily aligned correctly in relation to the overhead high voltage lines.

The disconnectors may conveniently have a pantograph configuration and may be disposed in selected angular positions relative to remaining parts of the switch assembly, therewith affording a high degree of flexibility in configuring the switchgear lay-out. When the switch assembly includes current meters, preferably optical current meters, said meters will preferably be mounted on the circuit breaker in a manner such that the current path between circuit breaker and circuit disconnector will pass solely through the current meter while insulating said circuit breaker and disconnector from one another in other respects.

BRIEF DESCRIPTION OF THE DRAWINGS

These embodiments and other preferred embodiments of the invention will be apparent from the depending claims.

The invention will now be described in more detail with reference to a detailed description of preferred embodiments thereof and also with reference to the accompanying schematic drawings, in which

FIG. 7 illustrates the base on which the switch assembly stand is supported;

FIG. 8 is a detailed illustration of part of the base shown in FIG. 7;

DETAILED DESCRIPTION OF THE PREFERRED EMBODIMENTS

Figure 1:
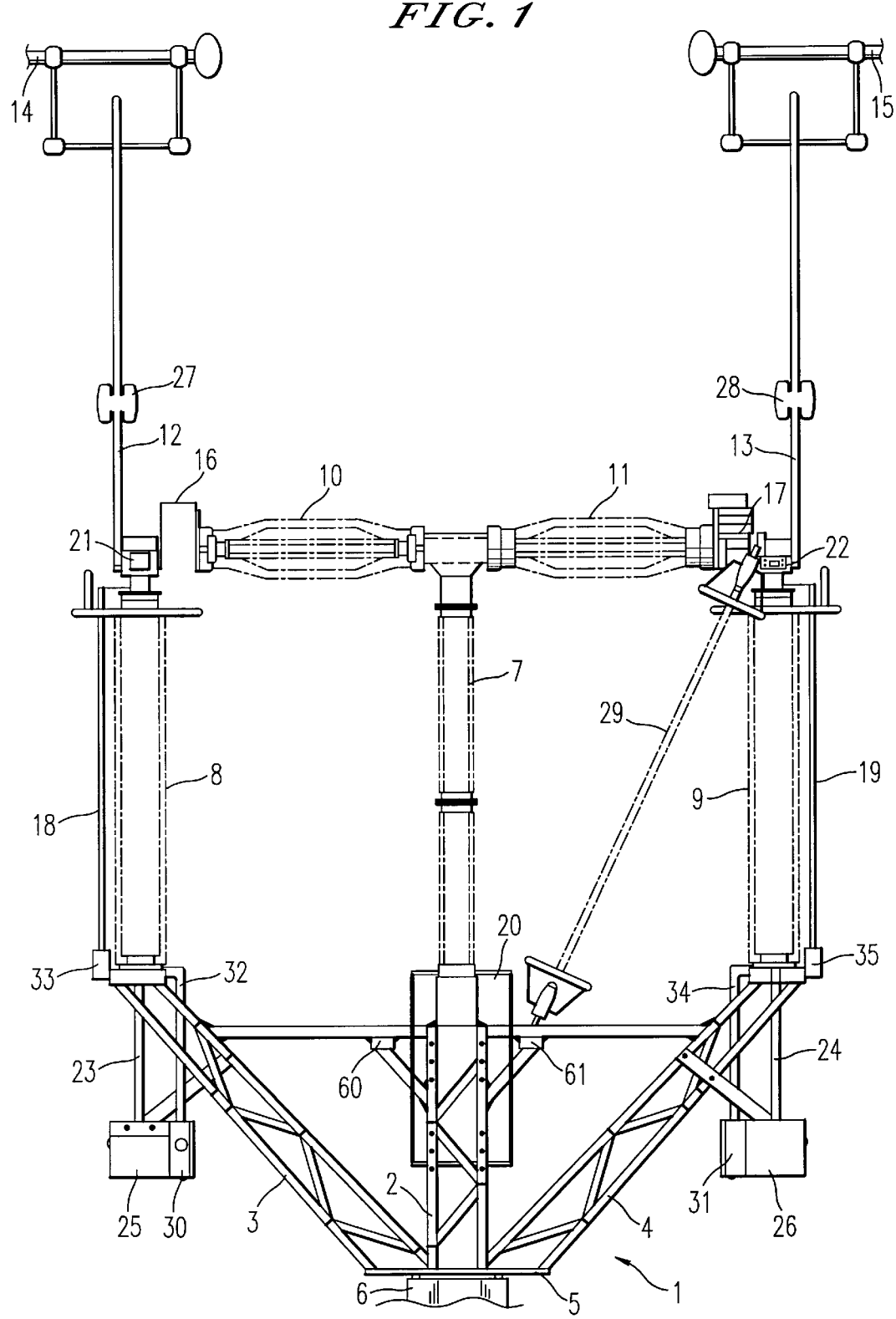
FIG. 1 is a side view of a first embodiment of an inventive switch assembly.

The invention is illustrated schematically in the drawings and components that are irrelevant to the invention have been omitted for clarity reasons.

The switch assembly illustrated in FIG. 1 has a stand 1 that includes a central member 2 and two obliquely extending members 3 and 4. The stand members are typically steel lattice structures and extend from the lower end of the central stand member to an support base 5 in the form of a base plate anchored to a ground foundation 6. The upper part of the stand includes supporting insulators, including a central supporting insulator 7 connected to the central stand member 2 and two supporting insulators 8 and 9 disposed on respective sides of the central supporting insulator 7 and connected to a respective obliquely extending stand member 3 and 4. The central supporting insulator 7 carries a two-element circuit breaker with the two breaker elements 10 and 11 disposed in a T-shaped mount. Each of the breaker elements 10, 11 carries on its outer end a respective circuit disconnector 12 and 13, which are supported by the side-related supporting insulators 8 and 9. The disconnectors 12, 13 are of a pantograph kind and are shown in a connected mode in which they are in contact with respective insulated conductors of the high voltage line. The supporting insulators are made typically of porcelain or polymeric material. The disconnector 12 shown on the left of FIG. 1 is connected electrically to a corresponding circuit breaker element 10 by a conductor 16, and a current meter 17 is disposed in a corresponding conductor for the right-hand disconnector (hidden in the Figure). An earthing switch 18, 19 is connected to each disconnector 12, 13.

The switch assembly includes operating means and signal transmission means, wherein operating means for coaction with the breaker elements 10 and 11 are disposed within the central supporting insulator 7 and extend down to a circuit breaker maneuvering unit 20 attached to the central stand member 2. The operating means of each disconnector 12, 13 includes a respective operating switch 21 and 22 which are connected to a respective disconnector maneuvering unit through the medium of maneuvering insulators (not shown) and arms 23, 24 that extend parallel with respective supporting insulators 8, 9. The disconnector is maneuvered by turning its lower end, its maneuvering end, around a geometric line that extends in the longitudinal direction of the circuit breaker, so as to twist the disconnector in a plane perpendicular to the plane of the paper and bend the disconnector at its pivot point 27 and 28 respectively, therewith moving the upper end of the disconnector, its contact end, out of contact with its respective line conductor 14 and 15.

The current meter 17 is preferably an optical meter, and signal transmission means 29 comprising optical fibers extends to the lower part of the stand. The earthing switch 18, 19 is operated from earthing units 30 and 31 via respective movement transmission means 32, 33 and 34, 35.

The stand 1 is provided with lifting devices 60, 61 that enable the stand to be lifted. The illustrated lifting devices have the form of hollow beam elements that are dimensioned and mutually spaced to accommodate the times of a fork-lift truck. Alternatively, the lifting devices may be constructed specifically for coaction with a service trolley designed to this end.

It will be evident from FIG. 1 that the entire switch assembly is symmetrical in the plane of the paper in relation to a vertical line drawn through the base plate 5 and the central stand member 2. The switch assembly is also substantially symmetrical in relation to the plane of the paper. The centre of gravity of the assembly thus lies centrally above the base plate 5, therewith providing optimal stability and facilitating lifting and transportation of the assembly.

Figure 2:
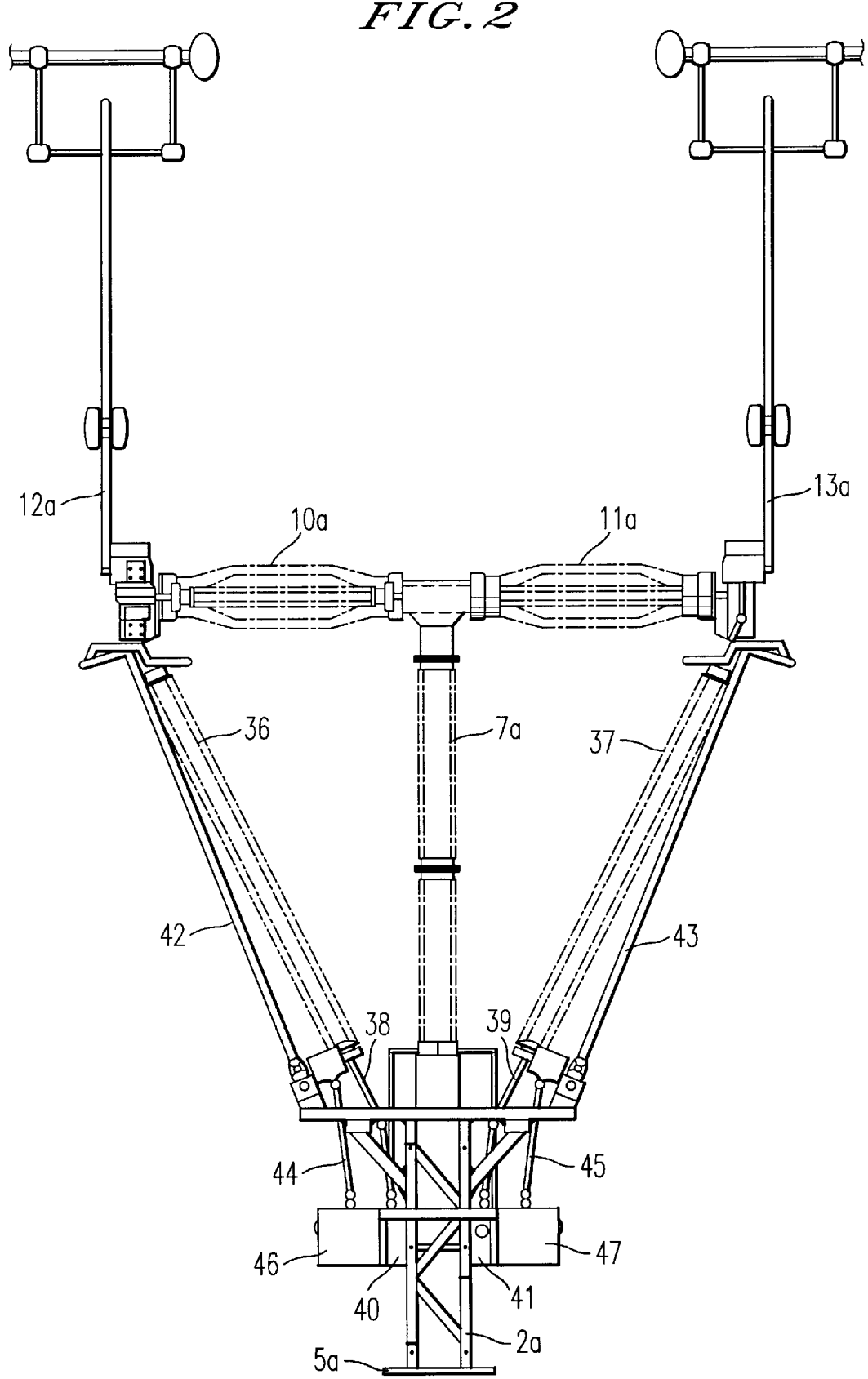
FIG. 2 is a side view of a second embodiment of an inventive switch assembly.

The main difference between the embodiment illustrated in FIG. 2 and that illustrated in FIG. 1 resides in the fact that each disconnector 12a, 13a is supported by a respective breaker element 10a, 11a and their central supporting insulator 7a and the central stand member 2a. This embodiment takes a further step towards providing a switch assembly that is as compact as possible, by virtue of eliminating the side-related stand members 3, 4 of the FIG. 1 embodiment and the separate disconnector supporting insulators 8, 9. The disconnectors 12a, 13a are maneuvered by maneuvering insulators 36, 37 which extend obliquely downwards from respective disconnectors to the central stand member 2a and in which there are disposed movement transmission means that connect with respective disconnector maneuvering units 40, 41 through the medium of conductive arms 38, 39. The maneuvering insulator also accommodates optical cables for transmitting signals from the current meters. The earthing switches 42, 43 are operated from the units 46, 47 through the medium of said arms 44, 45. Thus, all operating units and signal receiving units required by the switch assembly are concentrated at the central stand member 2a.

Figure 4:
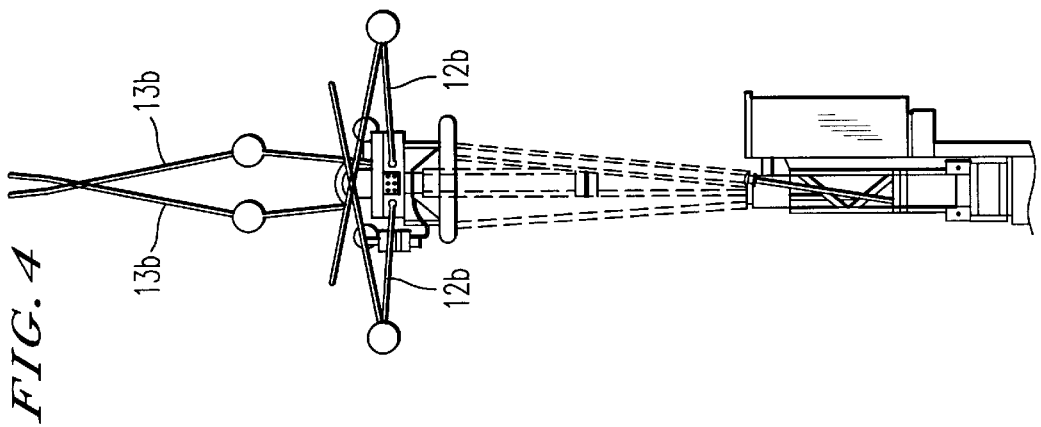
FIG. 4 is an end view of the switch assembly shown in FIG. 3.
Figure 3:
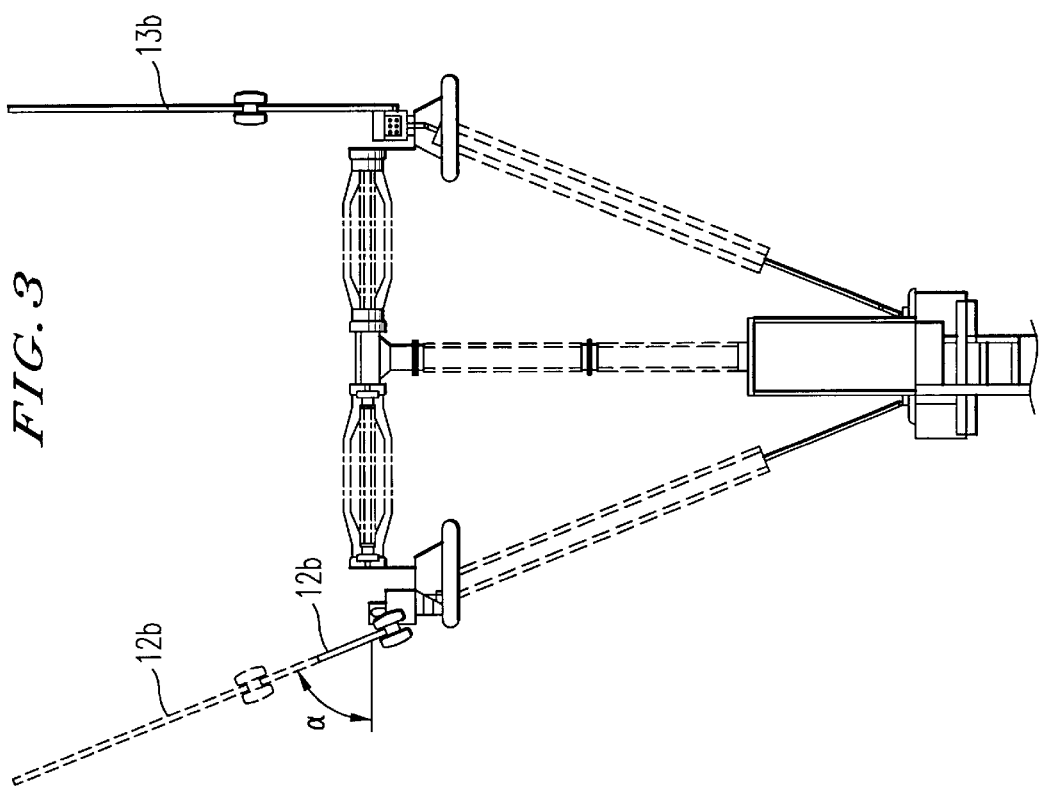
FIG. 3 is a side view of a third embodiment of an inventive switch assembly.

The embodiment of the switching assembly illustrated in FIG. 3 is a slightly modified version of the embodiment illustrated in FIG. 2, with certain elements omitted. The FIG. 3 embodiment differs from the FIG. 2 embodiment insomuch that one disconnector 12b defines an angle α with the horizontal plane instead of being perpendicular thereto as in the previously described embodiments. The disconnector 12b is shown in its collapsed, disconnected position in full lines, and in its extended position in broken lines. In the FIG. 3 embodiment, the angle α lies in a vertical plane through the longitudinal axis of the breaker elements 10b, 11b, i.e. in the plane of the paper. Alternatively, the disconnector may be angled in a plane extending perpendicular to the plane of the paper in FIG. 3. FIG. 4 is a side view of the switch assembly shown in FIG. 3, with the disconnector 13b shown in an upwardly extending position in contact with the high voltage line and the disconnector 12b in a collapsed, disconnecting position.

Figure 5:
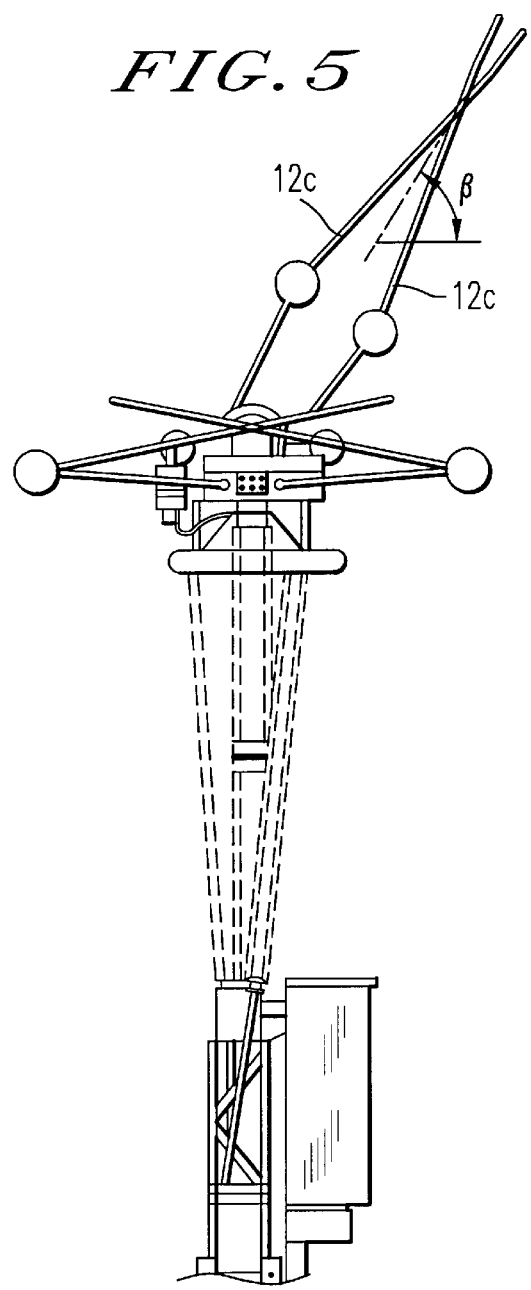
FIG. 5 is an end view similar to that of FIG. 4 but illustrating a fourth embodiment of an inventive switch assembly.

FIG. 5 shows an alternative in which the disconnector 12c is angled at an angle β in the plane perpendicular to the plane in which the disconnector 12b in FIG. 3 is angled. Another modification is one in which the disconnector is angled in both of said planes, i.e. at both α and β angled other than 90°.

Figure 6:
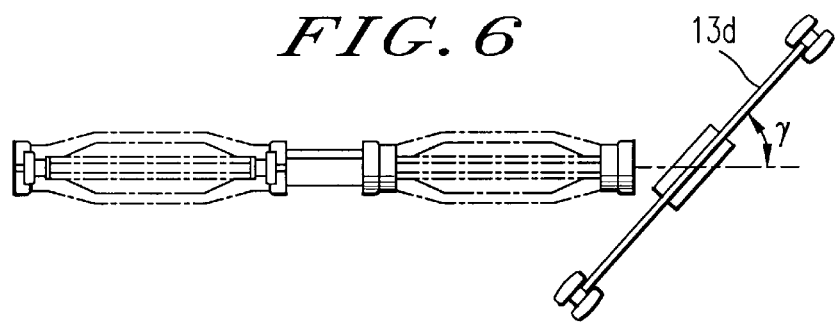
FIG. 6 illustrates a fifth embodiment of an inventive switch assembly schematically and from above.

All of the aforedescribed angular positions in which a disconnector may be mounted assume that the disconnector will move in a direction that lies in a plane perpendicular to the plane of the paper in FIG. 3 when maneuvered. In a modified version, the direction of movement may conceivably lie in a plane that has an angle γ other than a right angle to the plane of the paper in FIG. 3. This alternative is illustrated schematically in FIG. 6, which shows the circuit breaker from above and the disconnector 13d in a collapsed state, wherein only one part of the disconnector is shown. The plane in which the disconnector moves defines an angle γ with the centre line through the circuit breaker.

FIG. 7 is a detailed illustration of the base plate 5 of the support base. The base plate is firmly attached to the support base 6 by means of a number of bolts 48 which are moulded in the support base and enable the base plate 5 to be adjusted vertically and angularly. The manner in which this is achieved will be apparent from FIG. 8, which is a detailed view of the bolt adjusting means. The vertical position of the base plate is adjusted by screwing down or backing off an externally threaded bush 49 into or out of the base plate, whereafter the base plate is fixed in its adjusted position by tightening a nut 50.

Figure 9:
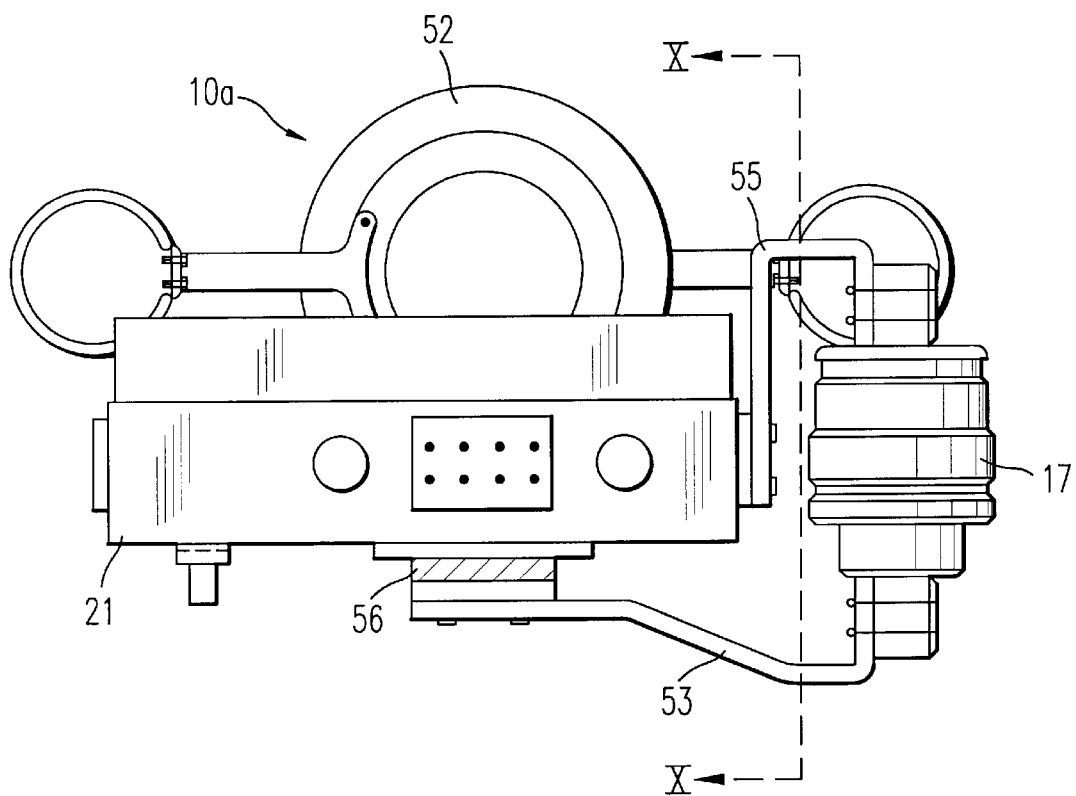
FIG. 9 is a side view illustrating the connection between circuit breaker and disconnector in one embodiment of the inventive switch assembly.
Figure 10:
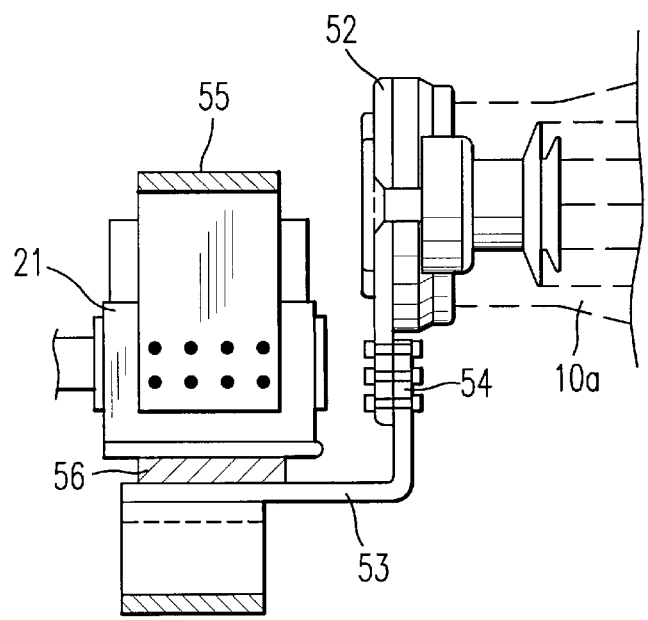
FIG. 10 is a sectional view taken on the line X—X in FIG. 9.

FIGS. 9 and 10 illustrate in more detail the manner of connection between disconnector and associated breaker element 10a in an embodiment in which the disconnector is carried by the breaker. A current conducting bar is rigidly connected to the end terminal 52 of the breaker element 10a by means of a joint 54. The bar 53 is firmly fixed to the disconnector operating switch 21 via an insulating insert 56, and is connected electrically to one end of the current meter 17. The other end of the current meter is electrically connected to a second conductor bar 55 which is connected to the disconnector operating switch 21 and also to the disconnector itself. The conductor bars 53, 55 thus have the double function of leading current to the circuit breaker and the disconnector through the current meter and also of supporting the disconnector and the current meter.

What is claimed is:

1. A switch assembly for high voltage overhead lines, said switch assembly having a horizontal extension and components, said components comprising:
   at least one circuit breaker provided with operating means, the circuit breaker acting in a horizontal breaking direction, where horizontal being perpendicular to a direction of a gravitation pull from earth,
   at least one circuit disconnector provided with operating means, and
   stand means for commonly supporting said circuit breaker and said circuit disconnector,
   wherein the stand means having only one stand support base which supports all of the components of the switch assembly and which has a length that is shorter than a horizontal extension in the breaking direction of the switch assembly.

2. A switch assembly according to claim 1 which further includes at least one current measuring means and one earthing switch carried by said stand means.

3. A switch assembly according to claim 1 in which each disconnector has an operating end which is mounted on an associated circuit breaker and carried thereby.

4. A switch assembly according to claim 1 in which said stand means includes a central stand member that extends vertically from said anchor base, wherein said disconnector has an operating end that is spaced laterally from said central stand member, wherein the disconnector operating means includes an elongated movement transmission element that extends between said operating end and said central stand member and thus positioned obliquely in relation to said vertical direction.

5. A switch assembly according to claim 4 in which said movement transmission element has a form of an insulator.

6. A switch assembly according to claim 4 in which said movement transmission element is adapted to carry out at least a linear movement in its longitudinal direction and a rotary movement relative to the longitudinal direction.

7. A switch assembly according to claim 4 in which said movement transmission element is tubular and accommodates at least one signal transmission optical fibre.

8. A switch assembly according to claim 1 in which the support base includes a horizontal base plate that includes adjustment means for adjusting an angular position of the base plate in relation to the horizontal plane and also for adjusting the vertical position of said base plate.

9. A switch assembly according to claim 1 in which said stand means includes attachment means for attachment to switch assembly lifting means.

10. A switch assembly according to claim 1 comprising pantograph-type disconnectors.

11. A switch assembly according to claim 1 in which each disconnector has an operating end which is pivotally connected to a remainder of the assembly, and a contact end for abutment with an associated high voltage line, wherein a connecting line between said ends in the contact mode defines with the horizontal plane an angle of generally 90° with respect to at least one of said disconnectors.

12. A switch assembly according to claim 1 in which each disconnector has an operating end pivotally connected to a remainder of the assembly and a contact end for abutment with an associated high voltage line, wherein a connecting line drawn between said ends in a contact mode defines with the horizontal plane an angle that is less than 90°, at least with respect to one of said disconnectors.

13. A switch assembly according to claim 1 in which each of said disconnectors is arranged in connection with each of said circuit breakers, wherein said circuit breaker includes a rotationally symmetrical body, wherein said disconnector is adapted to move in one plane when maneuvered, and wherein said plane and the longitudinal axis of said circuit breaker define therebetween an angle of substantially 90° with respect to at least one of said disconnectors.

14. A switch assembly according to claim 1 in which each of said disconnectors is disposed in connection with each of said circuit breakers, wherein said circuit breaker includes a generally rotationally symmetrical body, wherein said disconnector is adapted to move in one plane when maneuvered, and wherein said plane and the longitudinal axis of said circuit breaker define therebetween an angle that is smaller than 90°, at least with respect to one of said disconnectors.

15. A switch assembly according to claim 1 that includes optical current measuring means.

16. A switch assembly according to claim 1 in which at least one of said disconnectors is conductively connected to one of said circuit breakers solely in a current path that passes through a current measuring means.

17. A switch assembly according to claim 1, wherein said assembly is symmetrical about at least each of two mutually perpendicular vertical planes extending through said support base, where vertical being with respect to the horizontal breaking direction.

18. A switch assembly according to claim 2 in which each disconnector has an operating end which is mounted on an associated circuit breaker and carried thereby.

19. A switch assembly according to claim 2 in which said stand means includes a central stand member that extends generally vertically from said anchor base, wherein said disconnector has an operating end that is spaced laterally from said central stand member, wherein the disconnector operating means includes an elongated movement transmission element that extends between said operating end and said central stand member and thus positioned obliquely in relation to said vertical direction.

20. A switch assembly according to claim 3 in which said stand means includes a central stand member that extends generally vertically from said anchor base, wherein said disconnector has an operating end that is spaced laterally from said central stand member, wherein the disconnector operating means includes an elongated movement transmission element that extends between said operating end and said central stand member and thus positioned obliquely in relation to said vertical direction.

21. A switch assembly for high voltage overhead lines, said switch assembly having a horizontal extension and components, said horizontal extension being oriented in a horizontal direction with respect to an underlying ground terrain, comprising:
   a circuit breaker being configured to break in the horizontal direction;
   a circuit disconnector being electrically coupled to said circuit breaker when said circuit disconnector is in a closed state; and
   a stand configured to be a sole support for said circuit breaker and said circuit disconnector, said stand having a single stand support base that supports all of the components of the switch assembly and having a length being shorter than a length of the horizontal extension of the switch assembly.

* * * * *